Aug. 24, 1965    H. N. K. PATON    3,202,461
RAISABLE FLUIDIZING STRIP CONTAINER DISCHARGE MECHANISMS
Filed Dec. 27, 1962    3 Sheets-Sheet 1
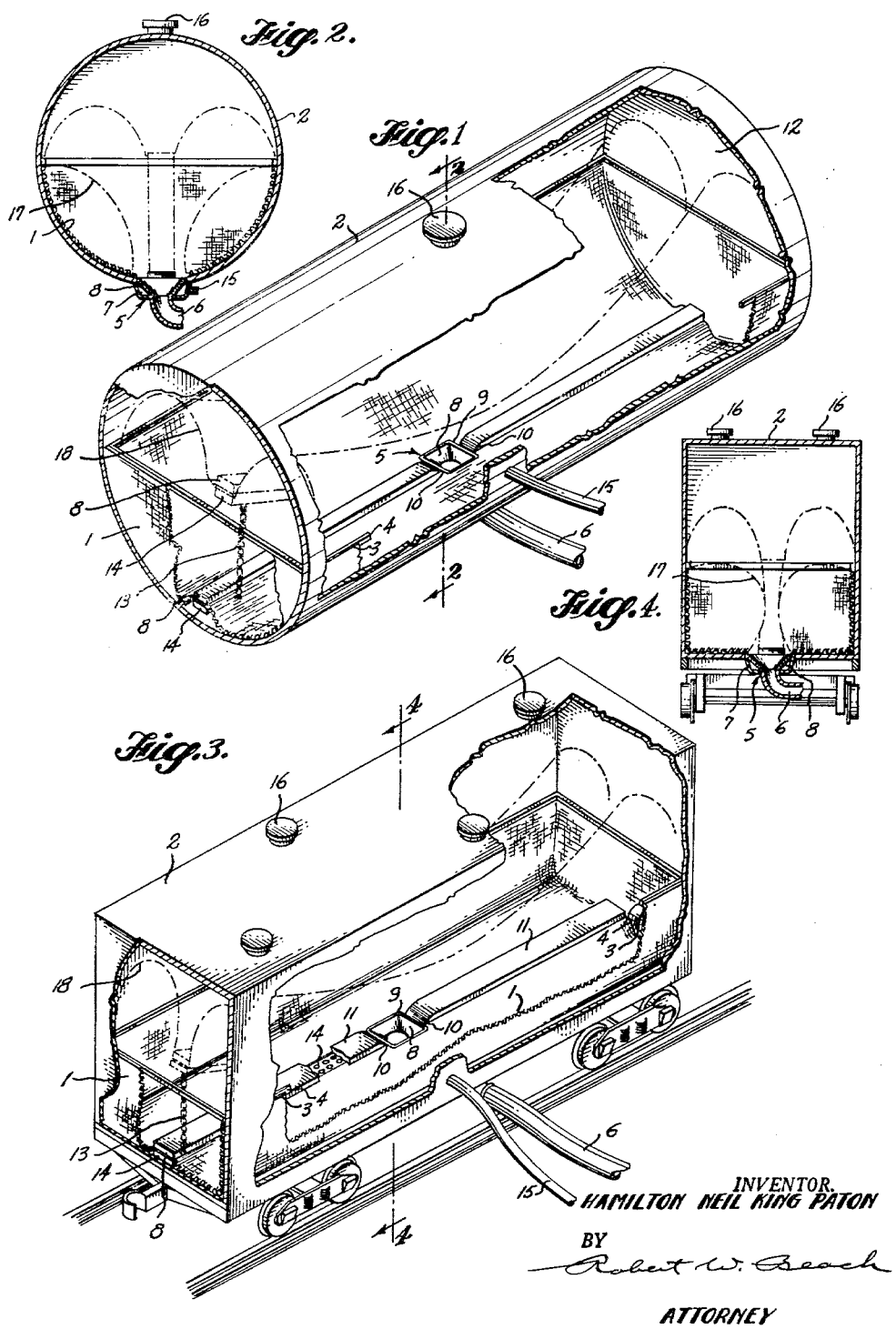
INVENTOR.
HAMILTON NEIL KING PATON
BY
Robert W. Beach
ATTORNEY

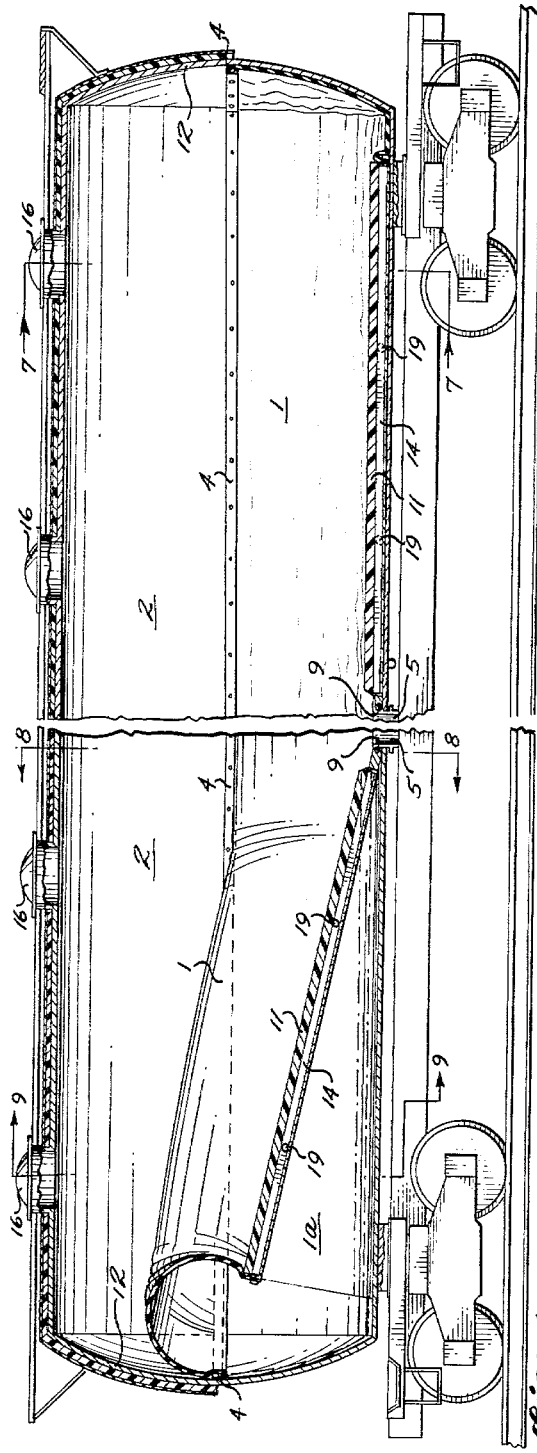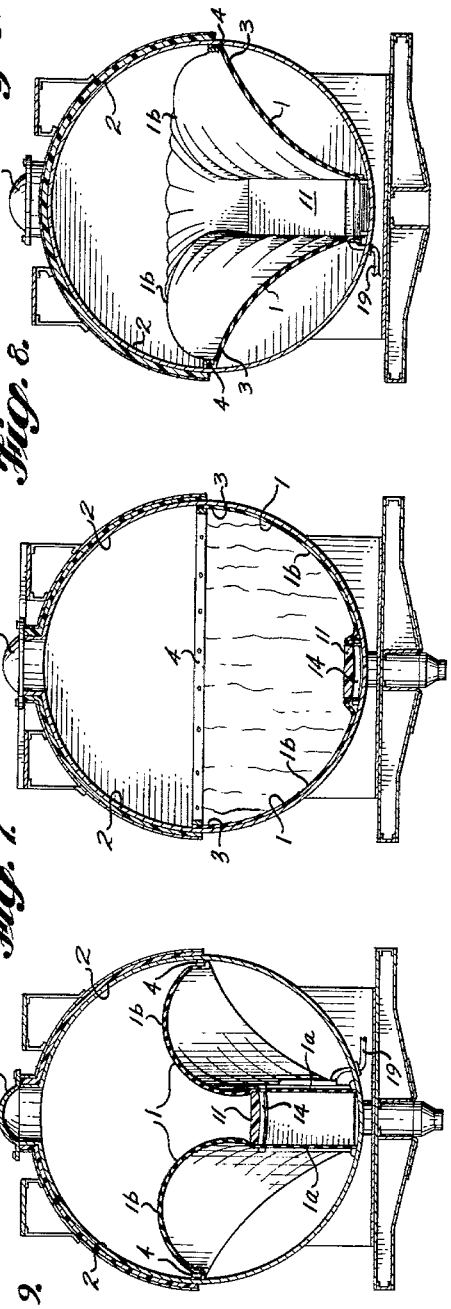

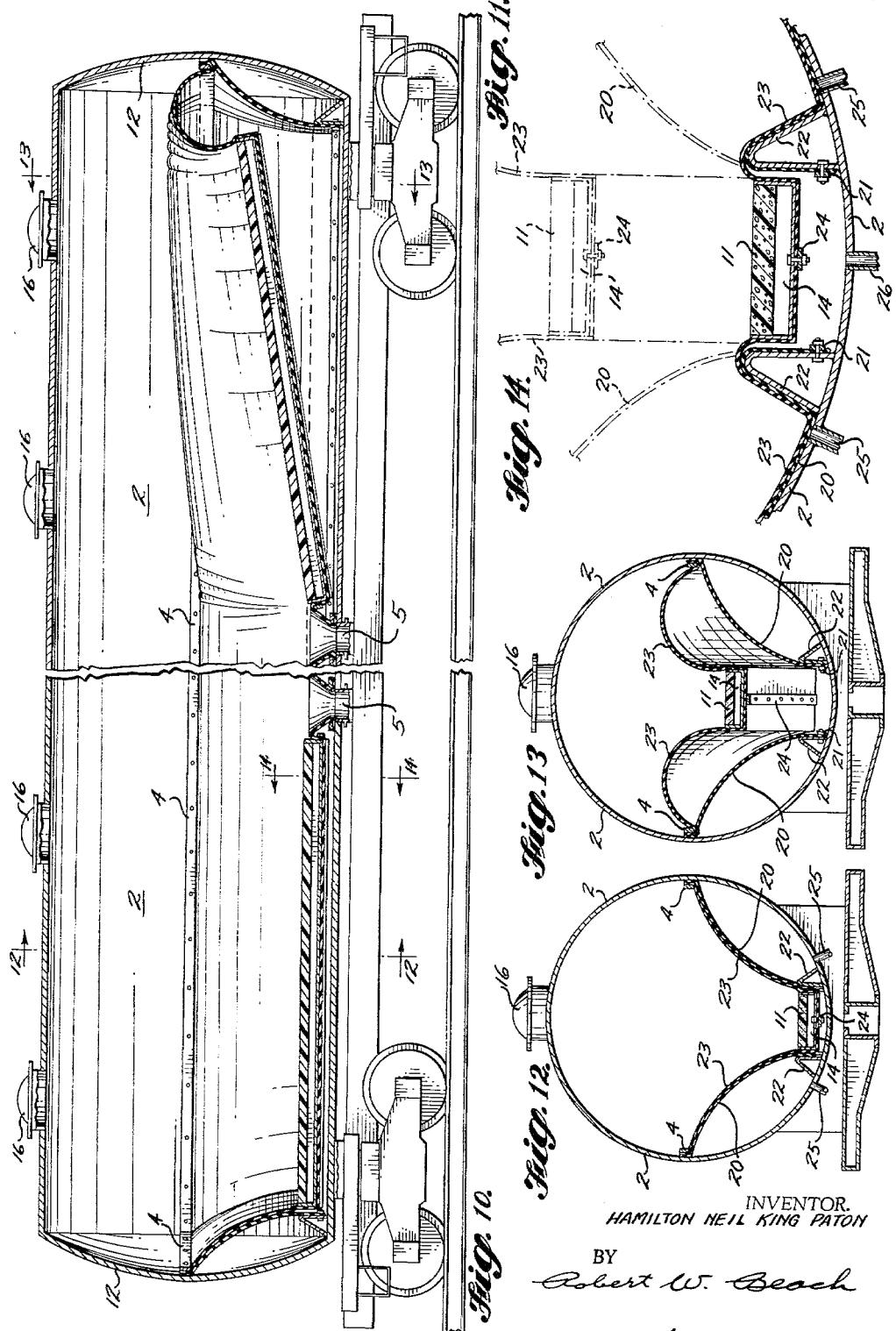

United States Patent Office 3,202,461
Patented Aug. 24, 1965

3,202,461
RAISABLE FLUIDIZING STRIP CONTAINER
DISCHARGE MECHANISMS
Hamilton Neil King Paton, Bellevue, Wash., assignor, by
mesne assignments, to Granu-Flow Equipment, Ltd.,
Vancouver, British Columbia, Canada, a corporation of
British Columbia, Canada
Filed Dec. 27, 1962, Ser. No. 247,688
9 Claims. (Cl. 302—52)

This invention relates to automatic unloading devices for elongated containers used for the transportation and/or storing of pulverized and granular materials, such as cement, flour, grain and the like. This application is a continuation-in-part of my United States patent application Serial No. 163,556, filed January 2, 1962, for Raisable Fluidizing Strip Container Discharge Mechanism, now abandoned.

Unloading devices for containers, especially those used in transportation, are not broadly new and it is common practice to use inclined floors to aid in the unloading operations. Because the particle friction of various pulverized and granular materials is different, only relatively steep, fixed inclines are dependable for gravity unloading. Floors with fixed inclines cause a loss in storage volume. The present invention is designed to eliminate the foregoing objections and provide a simple automatic unloading device which will give efficient, dependable unloading.

The main object of this invention is the provision of an automatic unloading mechanism which can be adapted to any horizontally elongated container used for the transportation and/or storing of pulverized or granular materials.

Another important feature is the provision of pneumatic fluidizing raisable strips running the greater portion of the length of the container to a floor discharge opening.

A still further object is the provision of a lightweight automatic unloading device which requires a minimum amount of space, can be installed with only minor modifications in horizontally elongated containers and is easily removable if the container is desired for other service.

Also important is the provision of a device which will assume a form approximating a large hopper in the bottom of the container during unloading operations.

A more specific object is to provide unloading mechanism for horizontally elongated containers which can be manipulated to provide unloading of the tank contents in a plurality of stages. During the first stage unloading is effected by gravity alone. During the second stage unloading is assisted by aeration of the material. During the third stage unloading is further assisted by changing the effective contour of the lower portion of the container to provide a hopper effect, and the production of such hopper effect can be itself accomplished in stages if desired.

Further, the device provides low maintenance and operating costs for complete automatic unloading of trucks, trailers and freight cars, as well as other containers.

To accomplish the objects of this invention a horizontally elongated container adapted to hold material of small particle form is lined with a flexible gas-impervious lining in its lower portion. The lining is disposed to rest on the adjacent inside surface of the container and the top edge of the lining is secured by a gas-tight seal in a horizontal plane about the inside perimeter of the container to form a gas-impervious pocket between the lining and the inside lower portion of the container which may be inflated. Centrally located in the floor of the container is a discharge port controlled by an appropriate gate valve. A flange around the port secures the lining with an air-tight seal. On opposite sides of the port are two long fluidizing strips, respectively, approximately the same width as the discharge port, extending lengthwise in the container from such port to locations just short of the ends of the container. The ends of the fluidizing strips adjacent to the port are hinged but the other ends can rise, inclining the strips toward the discharge port. The fluidizing strips are attached to the lining and can be raised by inflating the pocket behind the lining. A gas-distributing manifold with suitable connections distributes the pressurized gas to the fluidizing strips, the fluidizing elements on the inside surfaces of the discharge port and to the pocket between the lining and the container. A double lining can be used, if desired, enabling such lining to be manipulated first to move material generally transversely of the length of the container from its side portions onto the fluidizing strips, and subsequently to enable the fluidizing strips to be moved into positions inclined toward the discharge port.

FIGURE 1 is a top perspective of an elongated cylindrical container equipped with the unloading mechanism of the present invention, having parts broken away, and FIGURE 2 is a transverse section taken on line 2—2 of FIGURE 1.

FIGURE 3 is a top perspective of a railway boxcar equipped with the discharge mechanism of the invention, with parts broken away, and FIGURE 4 is a transverse section through the boxcar taken on line 4—4 of FIGURE 3.

FIGURE 5 is a central longitudinal section through one end portion of a tank car having discharge mechanism somewhat different from that shown in FIGURES 1 and 2, such mechanism being illustrated in one position; and FIGURE 6 is a central longitudinal section through the opposite end portion of such a tank car showing the discharge mechanism in a different position.

FIGURE 7 is a transverse section through the tank car shown in FIGURES 5 and 6 on line 7—7 of FIGURE 5. FIGURE 8 is a transverse section through the tank car of FIGURE 6, taken on line 8—8 of that figure.

FIGURE 9 is a transverse section through the tank car of FIGURE 6, taken along line 9—9 of that figure.

FIGURE 10 is a central longitudinal section through an end portion of a tank car disclosing a different type of discharging mechanism. FIGURE 11 is a longitudinal section through the opposite end portion of such a tank car, showing the discharging mechanism in a different position.

FIGURE 12 is a transverse section through the tank car shown in FIGURE 10, taken on line 12—12 of that figure.

FIGURE 13 is a transverse section through the tank car taken along line 13—13 of FIGURE 11.

FIGURE 14 is a detailed transverse section through the lower portion of the tank car shown in FIGURES 10 and 11, with the unloading mechanism shown in a different position.

For purposes of illustration the drawings show the raisable fluidizing strip container discharge mechanism installed in a horizontally elongated circular container and in a railway boxcar which demonstrates its adaptability to horizontally elongated containers of different shapes.

The raisable strip container discharge mechanism is adapted for use in any horizontally elongated container holding material of small particle form, such as flour, in which the lower surfaces of the container are gas-impervious, or can be made so. As shown in FIGURES 1 and 3, a flexible, nonelastic gas-impervious membrane is fashioned to form a lining 1 conforming to the lower inside portion of the container 2. The dimensions of the lining are at least as great as the corresponding inside dimensions of the lower portion of the container so that the lining can rest on the lower inside surfaces of the container, that is, the floor and the lower portions of the container sides.

The top edge 3 of lining 1 is sealed in a gas tight relationship to the sides of the container 2 in a horizontal plane by cleats 4 about the inside perimeter of the container. This attachment of the lining to the sides of the container is best shown in FIGURES 1 and 3 of the drawings and forms a gas-impervious pocket between the lining and the lower inside surfaces of the container.

Centrally located in the floor of the container 2 and the lining 1 is a discharge port 5. The discharge port is equipped with a controllable gate valve (not shown) and means for attaching it to a discharge hose 6 or, in the alternative, a discharge spot. It is preferably that the upper portion of the port be rectangular and the lower portion circular. The inside surfaces of the port may have gas-distributing ducts 7 and be lined with porous material sheets 8 for gas-fluidizing the pulverized or granular material in the vicinity of the port. A horizontal flange 9 extending radially outward at the top of discharge port 5 attaches the port in a flush relationship to the floor of the container. Sandwiched between the flange and the floor of the container is a portion of the lining which is secured in a gas-tight seal about the flange.

On opposite sides of the discharge port 5 two flat, rigid, elongated fluidizing strips 11, which are of substantially uniform width, approximately the width of the discharge port, extend lengthwise of the container 2 from the port to locations just short of the opposite container ends 12, respectively. The ends of the fluidizing strips adjacent to the discharge port are held against appreciable lifting, such as by being pivoted by hinge means 10 on flange 9 of the port. The ends of the strips remote from the discharge port can rise so that the strips slope oppositely from locations adjacent to the container ends down to the discharge port. The upward travel of the raisable ends of the fluidizing strips is limited in the construction of FIGURES 1 to 4 by limit chains 13 which allow the strips to rise to preselected acute angles to the floor of the container. Recessed chambers or pockets in the floor of the container 2 may be provided for storage of the limit chains when fluidizing strips are in their lower positions.

The fluidizing strips may rest on top of lining 1, being attached by suitable means, or in the alternative, the sides of such strips may be secured to or integrated with edge portions of the lining so that the effect would be the same as though the strips were resting on the lining. Thus the upper edge of the lining 1 is secured by a gas-impervious seal in a horizontal plane around the inside perimeter of the container and lower edge is sealed about the periphery of the discharge port 5 and connected to the elongated fluidizing strips 11.

The elongated fluidizing strips 11 are gas-permeable unloaders composed of fluidizing mat, preferably urethane foam sheets 8, and integrally foamed gas-distributing metal ducts 14. Urethane foam has innumerable minute cells interconnected so that the gas flow exudes through the surface of the foam which aerates the pulverized or granular material above it and allows the entire mass of material in the vicinity of the fluidizing strips to flow progressively downwards to the discharge port 9. Fluidizing or aeration of the pulverized or granular material tends to separate the particles of the material sufficiently to enable one particle to slide readily relative to another, but the air is not supplied in such volume as to move the material mechanically to the discharge port. The effect of the air reducing the friction between the adjacent particles of the pulverized or granular material is to enable the mass of material to flow much like a fluid.

A pressurized gas supply hose 15 is attached to a distributing manifold (not shown) and from the distributing manifold gas is supplied by suitable connections to the gas-distributing ducts 14 of the fluidizing strips 11 shown in FIGURE 3, to the gas-distributing ducts 7 on the inside surfaces of discharge port 5 as shown in FIGURE 4 and to the gas-impervious pocket between the lining 1 and the lower inside surfaces of the container 2. This gas-distributing manifold may be provided with suitable valves to control the supply of pressurized gas to the various above-mentioned elements, if it is desired to effect individual control.

In operation, during loading of the container 2, lining 1 is disposed against the lower inside surfaces of the container with the gate valve in the discharge port 5 being closed. One or more loading hatches 16 in the top of the container are open to receive the pulverized or granular material of small particle form. When the container is loaded the weight of the material is carried by the inside lower surfaces of the container as the lining is forced against these surfaces by the weight of the material, and the lining is not required to support appreciable loads during transportation and/or storage.

During unloading of material of small particle form from a container 2 one of the loading hatches 16 on the top of the container may be open to vent the container. A suitable hose 6 or spout is connected to the discharge port 5 and the gate valve on the port is opened. Initially that portion of the material most directly above the discharge port 5 will drop through the discharge port. As a second step gas under pressure, preferably air, is supplied from a suitable source to the distributing manifold and from the manifold by suitable connections to the duct 14 of the elongated fluidizing strips 11 and the ducts 7 in the discharge port. As previously discussed, the aeration of the material by the gas fluidizes the material so that a greater portion of the material is discharged than would be discharged by unaided gravity flow.

Fluidizing of the container contents by the fluidizing strips 11 extending lengthwise of the container when in horizontal position causes much of the material adjacent to the ends 12 of the container to be discharged by gravity flow. Initially the weight of the load of granular or pulverized material holds the lining 1 and the raisable fluidizing strips down against the surfaces of the container as shown in solid lines in FIGURES 2 and 4. As the load is progressively discharged the amount of material on the lining is decreased and, as a third step, air may be supplied to the gas impervious pocket formed between the lining and the container. During this operation the strips 11 preferably are held down by chains 13 or latches.

The lining 1 will first billow away from the sides of the container because the depth of the material, if any, is less on the side surfaces near the upper edge of the lining, and the lining will balloon progressively away from the sides and the floor of the container. The lining will form inclined surfaces along the sides and ends of the container constituting a large hopper shape trough in the bottom of the container, as shown by phantom line 17 in FIGURES 2 and 4 of the drawings, which funnels the material toward the fluidizing strips 11 and discharge port 5. Aided by the formation of these inclined surfaces along the sides and ends of the container the greater portion of the material to be discharged from the container is unloaded as a result of the fluidizing action and gravity flow.

With the greater portion of the load discharged the latches or chains holding down the fluidizing strips 11 can be released so that the lining 1 will billow farther away from the sides and then from the floor of the container, and as the lining is urged upward it swings progressively upward with it the fluidizing strips 11, inclining them toward the discharge port 5 to aid further the discharge of the material. The fluidizing strips are thus elevated into inclined position to the extent allowed by limit chains 13 and the lining balloons above the fluidizing strips after the limit chains are extended, thereby forming inclined surfaces from the sides and ends of the container to the fluidizing strips and the discharge port. The ultimate shape assumed by the lining in its fully inflated position is indicated by phantom line 18 in FIGURES 1 to 4. The sides of the hopper shape assumed by the lining are steeply inclined, which aid the fluidizing action to discharge all of the material.

After the unloading operation has been completed the air is released from the pocket between the lining 1 and the wall of the container 2, and the lining deflates, assuming its lowered position shown in full lines. If desired, suction may be applied to the air supply line connected to the pocket to assist in repositioning the lining, but usually this expedient is not necessary, or the vessel may be slightly pressurized to push all loose lining out against floors and walls.

In FIGURES 5 to 9, inclusive, an elongated cylindrical tank is shown as being used for a tank car. In this instance the elongated fluidizing floor strip 11 need not have an actual pivot, and there need be no chains 13 as shown in FIGURES 1 and 2. In this instance each of the linings 1 has a generally triangular portion 1a, one edge of which is attached to the bottom of the container along a line parallel to its longitudinal axis, and the other edge is attached to one edge of the corresponding fluidizing strip 11. The attachment lines of the edges of the lining portion 1a will be disposed substantially in a vertical plane. The other portion 1b of the lining 1 has an edge 3 attached by a strip 4 to the side of the container along a horizontal line, and the opposite edge of such lining portion is attached to the adjacent side of the fluidizing strip 11. The width of the lining portion 1b will be substantially uniform throughout its length, so that when the fluidizing strip is in its lowered position of FIGURES 5 and 7 the lining portion 1b will be of a width at least great enough to lie in engagement with the curved side of the container, as shown in FIGURE 7. The fullness of the lining portion 1a will lie beneath the lining portion 1b or the fluidizing strip 11.

When the container is filled with granular material through the openings 16, the fluidizing strip 11 will be in the lowered position shown in FIGURES 5 and 7, so that the load will be carried by the wall of the rigid container 1 on which the lining membrane lies. To unload the material through the discharge port 5 air will be supplied to the fluidizing strip 11 through the duct 14 by pipes 19 while the strip is held in its lowered position of FIGURES 5 and 7 by suitable latch means until all of the granular material which can be discharged in this manner has been discharged. As discussed previously, air will then be supplied to the gas-impervious pocket between the portion 1b of the lining and the container while the fluidizing strip is still held in its lowered position. Finally, the fluidizing strip will be released, whereupon the pressure of the air beneath the lining portions 1b attached to the opposite edges of the fluidizing strip 11 respectively will lift such strip into the inclined position shown in FIGURES 5, 8 and 9, while the portions 1a of the lining 1 will be stretched into substantially vertical, parallel planar relationship, as shown in FIGURE 9. Such lining portions 1a will limit the upward movement of the fluidizing strips.

In the construction illustrated in FIGURES 10 to 14, inclusive, a double lining is used. In this instance the fluidizing strip 11 and its air supply conduit 14 is generally the same as discussed previously and may be positively pivoted or simply floating. The lining includes a lower lining element 20 of substantially uniform width lengthwise of the container and of a width at least sufficiently great to lie against the side of the container 2 when the container is filled with granular material, as shown in FIGURE 14. The lower edge of the liner element 1 is secured to the bottom of the container along a line parallel to the axis of the container by a securing strip 21 as indicated in FIGURE 14. Preferably such lower edge extends over a projecting rib element 22 disposed alongside the fluidizing strip 11.

The upper lining elements 23 have their upper edges also secured along a horizontal line to the container wall such as by a strip 4, and the lower edges of these liners are secured to the fluidizing strip 11 by a securing strip or strips 24. Elements 23 are as wide as elements 20.

In unloading a container having a double liner of the type described, after all the material which can be removed from the container by the fluidizing action of the strip 11 in the horizontal position of FIGURES 10 and 12 has been discharged, air will be supplied to the gas-impervious pocket formed between the sides of the container and the lower liner element 20, as shown in FIGURES 10 and 12, to dump the granular material onto the fluidizing strip 11. Since the lower edges of the lower lining elements 20 are secured to the container, such billowing of the lining elements 20 will correspondingly billow the lining elements 23 but cannot raise the fluidizing strip 11 from the horizontal position shown in FIGURES 10 and 12, even though such fluidizing strip is not restrained from rising in any way. By this stage of the operation considerably more granular material will be discharged from the container by the fluidizing action of the strips 11, and the dumping action of the lining elements 20.

Air is supplied to the pockets beneath the lower lining elements 20 through air supply pipes 25. An additional air supply pipe 26 is connected to supply air beneath the air supply duct 14 for the fluidizing strip 11 and between the parallel projecting rib members 22. Such air supplied through the pipe 26 will therefore pass between the lower lining elements 20 and the upper lining element 23, both of which are of air-impervious character. If the supply of air through the pipe 26 is sufficiently great, the upper lining elements 23 will be raised from the positions shown in FIGURES 10 and 12 to the positions shown in FIGURES 11 and 13, whether or not the air supplied to the pockets beneath the lining elements 20 through pipes 25 is continued. The resulting incline of the fluidizing strips 11 will cause the remaining granular material to be moved from the end portions of the container toward the discharge port 5 so that the container will be completely emptied of granular material.

I claim as my invention:

1. Mechanism for unloading small particle material from a horizontally elongated container, comprising a discharge port in the lower portion of the container, an elongated, longitudinally rigid gas fluidizing strip at the bottom of the container and extending lengthwise thereof substantially to said discharge port means guiding said fluidizing strip for movement between a position substantially parallel to and adjacent to the floor of the container and a position inclined downwardly toward said discharge port, gas-distributing means connected to said fluidizing strip for supplying gas to be discharged therefrom for fluidizing material in the container, a flexible lining in the lower portion of the container and having a lower portion thereof engaged with opposite longitudinal sides of said fluidizing strip, means securing the upper portion of said lining in gas-tight engagement to the wall of the container, said lining being of a width between said fluidizing strip and said securing means such that its entire area can overlie and be backed contiguously by the wall of the container between said securing means and said fluidizing strip, and gas supply means connected to discharge gas between said flexible lining and the wall of the container which it overlies for billowing said lining upwardly away from the wall of the container into an upwardly bulging position and thereby raising said fluidizing strip into inclined position relative to the floor of the container.

2. Mechanism defined in claim 1, in which the discharge port is located between the ends of the container, two fluidizing strips are located at opposite sides of the discharge port, and the lining extends substantially from end-to-end of the container.

3. Mechanism defined in claim 1, in which the means securing the upper portion of the lining extends around the container substantially in a horizontal plane.

4. Mechanism defined in claim 1, in which the lining is secured around the discharge port with a gas tight seal.

5. Mechanism defined in claim 1, in which hinge means support the end of each fluidizing strip adjacent to the discharge port.

6. Mechanism defined in claim 1, in which the lining is secured to an edge of the fluidizing strip and to the floor of the container immediately beneath such fluidizing strip edge.

7. Mechanism defined in claim 1, in which the lining includes a lower lining element unsecured to the fluidizing strip and secured to the floor of the container adjacent to the fluidizing strip, and the lining further includes an upper lining element overlying the lower lining element and secured to the air fluidizing strip.

8. The mechanism defined in claim 1, in which the lining is attached to the fluidizing member for transmitting lifting force to lift the fluidizing member into its inclined position.

9. Mechanism for unloading small particle material from a horizontally elongated container, comprising a flexible, gas-impervious lining extending lengthwise of the lower portion of the container including portions extending along the sides and across the ends of the container of an extent sufficient to overlie the wall of the container in contiguous engagement therewith, means securing the upper portion of said lining with a gas-tight seal in a horizontal plane completely around the inside of the container, a discharge port located in the floor of the container between its ends, two elongated, longitudinally rigid fluidizing strips extending respectively from opposite sides of said discharge port lengthwise substantially to the ends of the container, raisable into positions inclined downwardly toward said discharge port and connected both to the end portions and side portions of said lining, gas supply means connected to said two fluidizing strips for discharge of gas therefrom to fluidize material in the container, and gas supply means connected to supply gas under pressure between said flexible lining and the container wall to billow the lower portion of said side and end lining portions away from the container wall and thereby raise said fluidizing strips into inclined position.

References Cited by the Examiner

UNITED STATES PATENTS

| 2,829,803 | 4/58 | Paton | 222—95 |
| 2,913,147 | 11/59 | Johnson et al. | 222—195 |
| 2,930,512 | 3/60 | Paton | 222—195 |
| 2,956,839 | 10/60 | Hermanns | 222—386.5 |
| 2,968,425 | 1/61 | Paton | 222—195 |

FOREIGN PATENTS

| 213,329 | 2/61 | Austria. |
| 826,105 | 12/59 | Great Britain. |

EVERETT W. KIRBY, *Primary Examiner.*